(12) United States Patent
Imai

(10) Patent No.: US 8,109,520 B2
(45) Date of Patent: Feb. 7, 2012

(54) CYLINDER HEAD GASKET AND METHOD OF MAKING CYLINDER HEAD GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 380 days.

(21) Appl. No.: 12/379,074

(22) Filed: Feb. 12, 2009

(65) Prior Publication Data

US 2009/0200755 A1    Aug. 13, 2009

(30) Foreign Application Priority Data

Feb. 12, 2008   (JP) ................................. 2008-030779

(51) Int. Cl.
*F02F 11/00*   (2006.01)
(52) U.S. Cl. ........................................ 277/593; 277/594
(58) Field of Classification Search ........... 277/591–598
See application file for complete search history.

(56) References Cited

U.S. PATENT DOCUMENTS

| | | | | |
|---|---|---|---|---|
| 3,794,333 A | * | 2/1974 | Czernik et al. ................ | 277/593 |
| 5,427,389 A | * | 6/1995 | Ishikawa et al. ............... | 277/595 |
| 5,478,092 A | * | 12/1995 | Ishikawa et al. ............... | 277/595 |
| 5,653,451 A | * | 8/1997 | Udagawa ....................... | 277/595 |
| 6,062,572 A | * | 5/2000 | Hasegawa et al. ............. | 277/592 |
| 7,147,231 B2 | * | 12/2006 | Koch .............................. | 277/592 |
| 7,311,310 B2 | * | 12/2007 | Diez et al. ...................... | 277/594 |
| 7,497,442 B2 | * | 3/2009 | Fukai .............................. | 277/594 |
| 7,527,269 B2 | * | 5/2009 | Tiefenbach et al. ........... | 277/593 |
| 7,753,378 B2 | * | 7/2010 | Kinoshita et al. ............... | 277/594 |
| 2005/0173868 A1 | * | 8/2005 | Hatamura et al. ............. | 277/593 |
| 2006/0103078 A1 | * | 5/2006 | Diez ............................... | 277/591 |
| 2006/0163817 A1 | * | 7/2006 | Ishikawa et al. ............... | 277/494 |

* cited by examiner

*Primary Examiner* — Thomas Beach
*Assistant Examiner* — Kelly Shaw
(74) *Attorney, Agent, or Firm* — Manabu Kanesaka

(57) ABSTRACT

A cylinder head gasket includes at least one metal plate having a plurality of cylinder bores, a plurality of liquid holes and a plurality of bolt holes. Sealing beads are formed around the cylinder bores and the fluid holes, and a parting bead is formed separately from the sealing beads. In case the at least one metal plate is divided, in a plan view, into four areas including a front side and a rear side, and an intake side and an exhaust side by two straight lines perpendicular to each other to have equal areas, respectively, the parting bead is added to at least one of the four areas such that a total length of the sealing bead and the parting bead therein is between 95% and 100% of one of the four areas having a longest total length of the sealing bead.

12 Claims, 4 Drawing Sheets

CYLINDER HEAD GASKET AND METHOD OF MAKING CYLINDER HEAD GASKET

BACKGROUND OF THE INVENTION AND RELATED ART STATEMENT

The present invention relates to a cylinder head gasket which is held between engine members and seals therebetween, specifically, a cylinder head gasket which can control the deformation of the engine members by equalizing a seal surface pressure, and a method of making a cylinder head gasket.

The cylinder head gasket of an engine is tightened by bolts in a state of being sandwiched between two members, such as a cylinder head and a cylinder block (cylinder body), of the engine of an automobile, and has a role for sealing fluid such as combustion gas, oil, coolant water and the like.

Comparing to conventional engines, recent engines have a tendency to change material from cast iron to aluminum alloy due to downsizing and reducing weight, and increase the pressure of combustion gas due to a higher power engine. Therefore, in the case wherein a cylinder is unevenly placed from the center of the width direction of the engine, the distribution of the surface pressure acting on the cylinder head through beads becomes uneven, and the cylinder head cannot be evenly pressed, so that the cylinder head may be deformed.

As a foregoing metal gasket, a cylinder head gasket, which is a metal cylinder head gasket for a multi-cylinder internal-combustion engine wherein the cylinder is arranged toward one side relative to the width direction, was proposed (for example, see the Japanese Patent Publication No. H10-19130). This cylinder head gasket has looped stepwise beads whose cross-sectional shape is stepwise along the peripheral border of the gasket in at least one sheet of gasket plates. In the cylinder head gasket, the strength of the beads located at a small area of the gasket when dividing the gasket by a line connecting the centers of cylinder bores, is strong, and the strength of the beads located at a large area of the gasket when dividing the gasket by the line connecting the centers of the cylinder bores, is weak.

In the metal laminate gasket, the seal surface pressure can be even throughout the gasket, and the sealing performance of the beads provided around water holes, oil holes and the like can be improved. However, if the looped stepwise beads are arranged around the gasket, a comparatively long bead is formed as compared to the case wherein the beads are arranged at a peripheral border portion of the cylinder bore, so that a high seal surface pressure cannot be retained well in the peripheral border portion of a sealing bore.

On the other hand, in order to prevent the deformation of a longitudinal direction of the cylinder head, a metal gasket with temperature-resistant, incompressible, and non-deforming projections, which are provided only on both ends of the longitudinal direction of the gasket, was proposed. Also, in order to prevent the deformation in the width direction of the cylinder head, a metal cylinder head gasket with anti-bending projections, each being provided between each of two end edges in the width direction and each through-bore, was proposed (for example, see Japanese Patent Publications No. H9-292027 and No. 2003-42295). The anti-bending projection has a large rigidity relative to a load in a compressive direction, and acts substantially as a rigid body relative to a locking force of each bolt.

In the above-mentioned cylinder head gaskets, the shape, length and the like of the anti-bending projection are not described. Also, the anti-bending projection has a role for preventing a seal projection (beads or the like) from being compressed excessively, and functions as the rigid body from a certain height. Therefore, in the case wherein the gasket is pressed from the certain height, the seal surface pressure of the seal projection does not increase.

The present invention has made in order to solve the problems described above, and an object of the present invention is to provide a cylinder head gasket held between two engine members for sealing therebetween, which can easily be designed as a means for preventing the deformation of the cylinder head based on a sealing means such as a bead and the like, and also can retain a high seal surface pressure.

Another object of the invention is to provide a method of designing the cylinder head gasket with the above structure.

Further objects and advantages of the invention will be apparent from the following description of the invention.

SUMMARY OF THE INVENTION

In order to achieve the objects described above, in a cylinder head gasket according to the invention, areas of a front side and a rear side in a plan view of the gasket are equally divided, and areas of an exhaust side and an intake side of the gasket are equally divided, so that the cylinder head gasket is divided into four areas. At this time, a parting bead is formed for the areas smaller than the largest area such that the total length of the beads in the area smaller than the largest area becomes more than 95% and below 100% of the total length of the beads in the largest area.

This parting bead differs from the bead which has a sealing function provided in a peripheral border portion of a sealing bore. Even though the parting bead has the shape of the bead, it does not form a seal line, and does not contribute to sealing. Also, in order to calculate the above-mentioned area, for the simplification of calculation, the calculation may include areas of the sealing bore, a bolt hole and the like. However, the calculation is preferable to exclude the above-mentioned areas in terms of evenness of a pressing force due to a surface pressure of the bead.

According to the structure, since the total length of the beads arranged in each area which was divided into four approximately equal areas is approximately equal, the area of a portion wherein a surface pressure is generated becomes approximately equal. Therefore, by a comparatively simple structure, force acting on each area becomes approximately equal, and pressing force acting on an engine member such as a cylinder head and the like becomes approximately equal, so that the deformation of the engine member can be controlled.

The total length of the beads in each area can be easily formed in a range of 95% to 100% without performing a pressing test obtaining a surface pressure distribution, so that the design of the gasket can be significantly simplified. Also, since the length or the position of the parting bead may be considered only in a plan view, the parting bead can be easily designed.

Especially, a tilt of the cylinder head on the front side and the rear side or a tilt of the cylinder head on the exhaust side and the intake side is reduced, so that the tilts become even. As a result, partial creep relaxation in use can be reduced, and durability can be extended.

In the cylinder head gasket, the cross-sectional shape of the parting bead has the same shape as the cross-sectional shape of the bead for water sealing or the bead for oil sealing. The reason for the above-mentioned structure is that since the parting bead can be easily arranged in a position away from a central line of the gasket, if a moment is considered, it is preferable to provide the shape of the bead for water sealing or oil sealing which has a lower seal surface pressure compared to that of the shape of the bead for the cylinder bore which has generally a high seal surface pressure. According to the structure, since the shape of the parting bead can be determined without recourse to the pressing test and the like, a design method thereof can be significantly simplified.

Also, it is preferable that the parting bead is provided in such a way that the arrangement of all the beads becomes approximately symmetrical with respect to a line relative to a line connecting the centers of the cylinder bores. According to this structure, a lateral bending moment of the exhaust side and the intake side becomes approximately equal relative to the line connecting the center of the cylinder bores, so that the deformation around the cylinder bores can be reduced.

Also, as for a cylinder head gasket design method, in a plan view, the area is equally divided into the front side and the rear side, and into the exhaust side and the intake side so as to be divided into four areas. At this time, the parting bead is additionally provided such that the total length of the beads in the area, which is smaller than the largest area, becomes more than 95% and below 100% of the total length of the beads in the largest area.

According to this method, by a very simple design method including the parting bead which, although it has the shape of the bead, does not form the seal line, and does not contribute to the direct sealing, the area of the portion wherein the surface pressure is generated can become approximately equal, and force acting on each area can become approximately equal. Therefore, pressing force acting on the cylinder head can become approximately equal, so that the cylinder head gasket which can control the deformation of the cylinder head can be designed.

According to the cylinder head gasket and the cylinder head gasket design method of the invention, the total length of the beads arranged in each area equally divided into four areas of the gasket become approximately the same length of more than 95% and below 100% relative to the longest area, so that the area of the portion wherein the surface pressure is generated becomes approximately equal. Thus, force acting on each area becomes approximately equal, and pressing force acting on the engine member such as the cylinder head and the like becomes approximately equal. Therefore, the deformation of the engine members can be controlled.

Also, the total length of the beads in each area can be easily formed in a range of 95% to 100% without performing the pressing test and the like, so that the design of the sealing means can be significantly simplified. Also, since the length or the position of the parting bead may be considered only in a plan view, the parting bead can be easily designed.

DETAILED DESCRIPTION OF PREFERRED EMBODIMENTS

Figure 1:
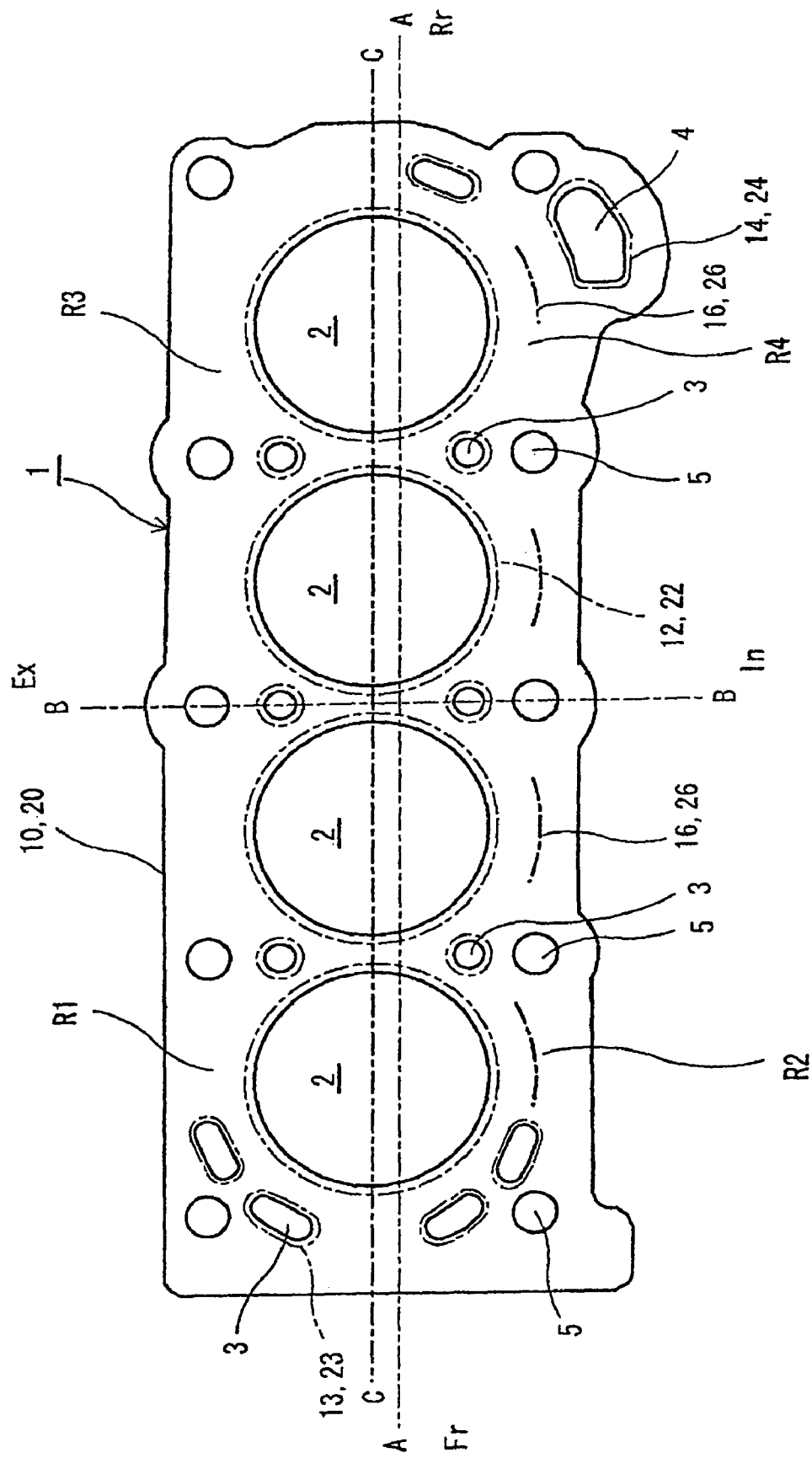
FIG. 1 is a plan view showing a cylinder head gasket of an embodiment of the present invention.
Figure 2:
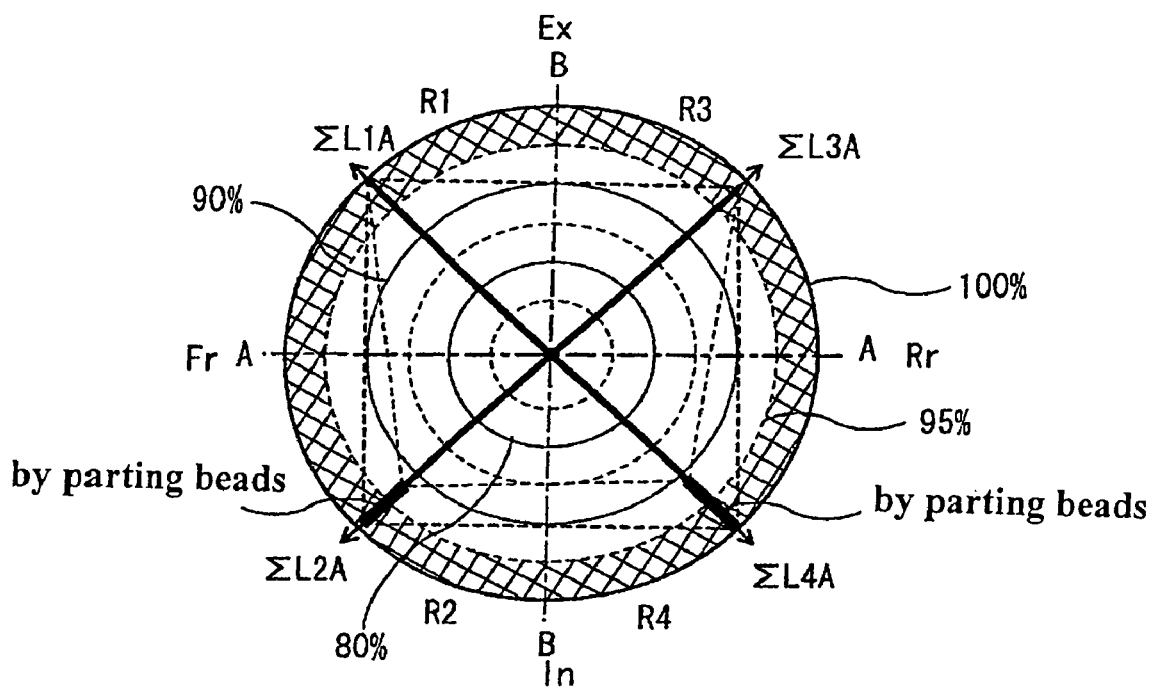
FIG. 2 is a schematic view showing the total length of beads including the length of parting beads of the cylinder head gasket in FIG. 1.
Figure 3:
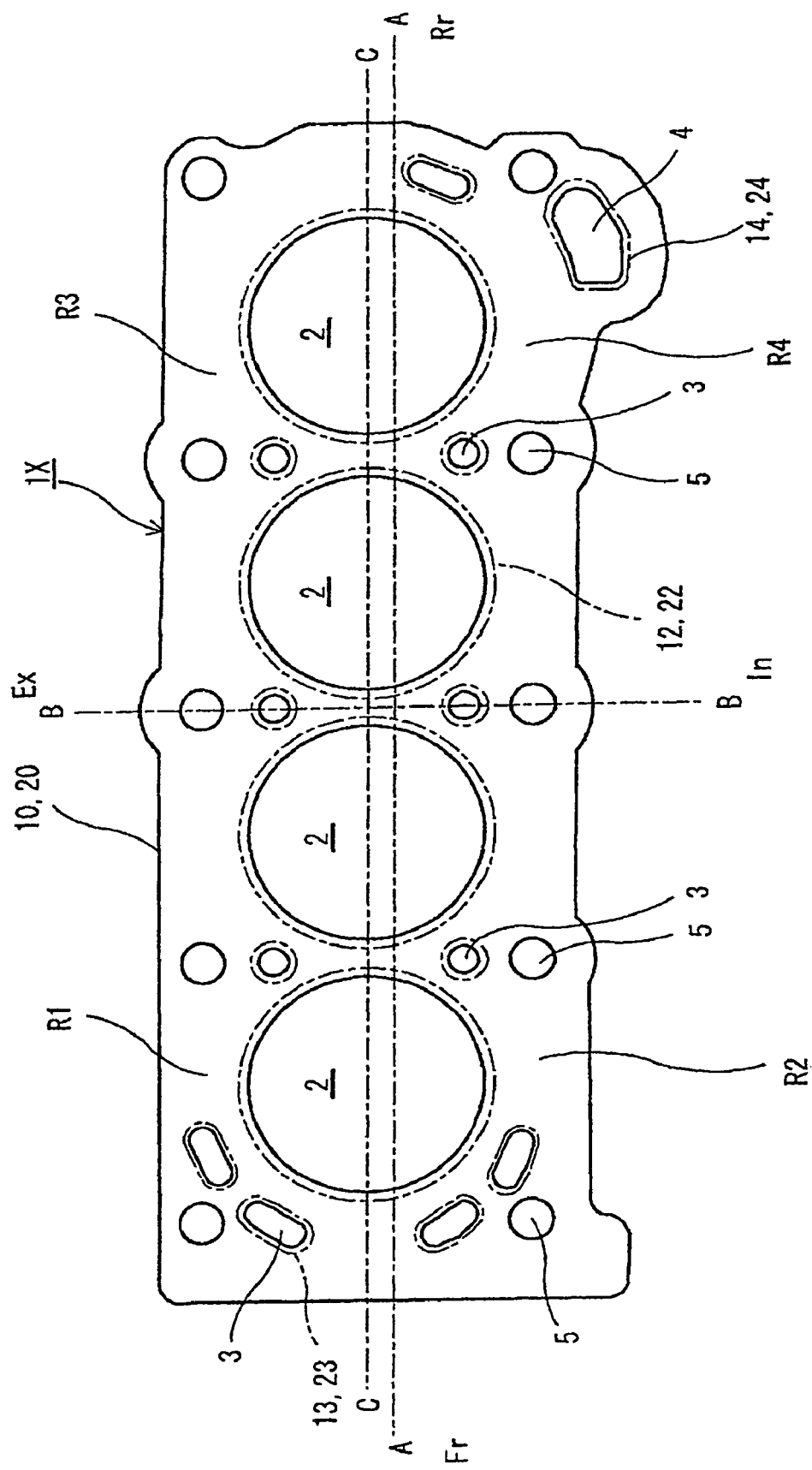
FIG. 3 is a plan view showing a conventional cylinder head gasket.

Hereunder, embodiments of a cylinder head gasket according to the present invention will be described with reference to the attached drawings. FIGS. 1, 3 are schematic explanatory views in which sizes, shapes or the like of sealing bores, beads, and parting beads are different from actual ones and enlarged for the sake of explanation.

The cylinder head gasket of the embodiment of the present invention is a metal gasket held between a cylinder block (cylinder body) and a cylinder head of an engine for sealing therebetween, and seals fluid such as gas emission, intake gas and the like.

The cylinder head gasket is formed by more than two sheets of metal structured plates (metal substrates) made of soft steel, annealed stainless (annealed material), or stainless thermal refining material (spring steel). Also, the planar shape of the cylinder head gasket is manufactured approximately according to the shape of a joint surface between the cylinder block and the cylinder head of the engine, and cylinder bores 2, water holes 3, oil holes 4 and bolt holes 5 for fastening bolts wherein combustion gas, water or oil passes through, are formed.

As shown in FIG. 1, a cylinder head gasket 1 of the embodiment of the present invention comprises more than one, e.g. two sheets (two sheets in FIG. 1) of metal structured plates 10, 20, and the metal structured plates 10, 20 are formed by, for example, annealed stainless. In peripheral border portions of the cylinder bores 2, sealing means are provided in the metal structured plates 10, 20. Full beads 12, 22 are provided relative to the cylinder bores 2; full beads 13, 23 are provided relative to the water holes 3; and full beads 14, 24 are provided relative to the oil holes 4. Incidentally, the above-mentioned full beads may be formed by a half bead as necessary. Also, the beads may be provided only on one side of the metal structured plates 10, 20 without providing on both sides of the metal structured plates 10, 20, and double-beads which surround the sealing bores and the like double may be used instead of the single-bead which singly surround the sealing bores.

The cylinder head gasket 1 in a plan view is divided by a straight line A-A into a front side Fr and a rear side Rr in such a way that both sides have equal areas, and by a straight line B-B into an exhaust side Ex and an intake side In in such a way that both sides have equal areas, so that the cylinder head gasket 1 is divided into four areas R1, R2, R3, R4. The above-mentioned areas may include areas of the cylinder bores 2, water holes 3, and oil holes 4. However, it is preferable to exclude the areas of the cylinder bores 2, water holes 3, and oil holes 4. FIG. 3 shows a conventional cylinder head gasket 1X in the above-mentioned state.

In the present invention, total or summation $\Sigma L1, \Sigma L2, \Sigma L3$ or $\Sigma L4$ of the length of the beads in each area R1, R2, R3, or R4 is calculated. The largest area (here, say R1) of the total length of the beads is obtained. Next, whether or not the total length $\Sigma L2, \Sigma L3,$ or $\Sigma L4$ of the length of the beads of the sum in the other areas R2, R3, or R4 have approximately the same length relative to the total $\Sigma L1$ of the length of the largest bead, is examined. More specifically, whether or not the total $\Sigma L2, \Sigma L3,$ or $\Sigma L4$ of the length of the beads in the other areas R2, R3, or R4 is more than 95% and below 100% of the total $\Sigma L1$ of the length of the beads in the largest area R1, is examined.

If the total $\Sigma L2, \Sigma L3,$ or $\Sigma L4$ of the length of the beads in the other area R2, R3, or R4 is not more than 95% and below 100%, parting beads 16, 26 are additionally provided. As shown in FIG. 1, the total $\Sigma L1A$ $(=\Sigma L1)$ $\Sigma L2A, \Sigma L3A,$ or $\Sigma L4A$ of the length of the beads including the length of the beads of the parting beads 16, 26 have approximately the same length. More specifically, the total $\Sigma L2A, \Sigma L3A,$ or $\Sigma L4A$ of the length of the beads including the length of the beads of the parting beads 16, 26 is more than 95% and below 100% of the total ΣL1A (=ΣL1) of the length of the beads of the largest area R1.

Figure 4:
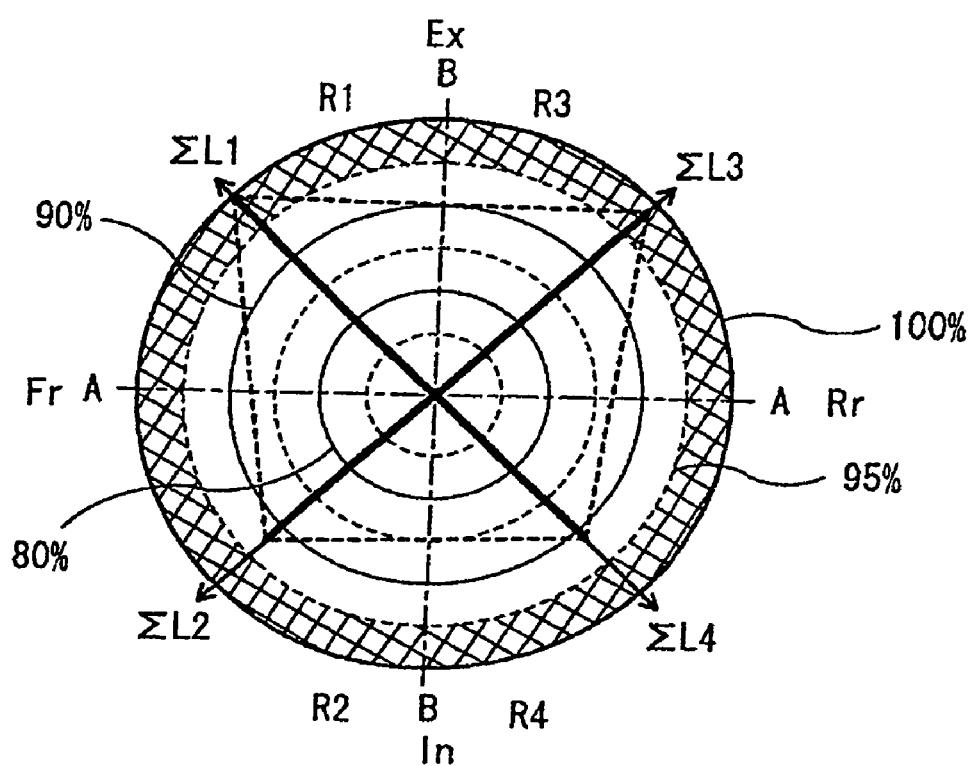
FIG. 4 is a schematic view showing the total length of beads of the cylinder head gasket of FIG. 3.

In the structure in FIG. 1, the parting beads 16, 26 are provided in the areas R2, R4. Therefore, it is expressed as ΣL2A>ΣL2, ΣL4A>ΣL4. However, in the case of ΣL1A=ΣL1 and the area R3 is not provided with the parting beads, it is expressed as ΣL3A=ΣL3. Incidentally, for reference, FIG. 4 is a schematic view showing totals ΣL1, ΣL2, ΣL3, ΣL4 of the length of the beads in each area R1, R2, R3, R4 of the conventional cylinder head gasket 1X in FIG. 3.

The parting beads 16, 26 differ from the beads 12, 13, 14, 22, 23, 24 which include a sealing function provided in peripheral border portions of the sealing bores 2, 3, 4. Although the parting beads 16, 26 have a bead shape, they do not form a seal line, and do not contribute to sealing directly.

The cross-sectional shape of the parting beads 16, 26 has the same shape as the cross-sectional shape of the beads 12, 22 for cylinder bore, and the beads 13, 14, 23, 24 for oil and water sealing. Due to the above-mentioned shape, the shape of the parting beads 16, 26 can be determined without recourse to a pressing test and the like, and a design method thereof can be simplified. The parting beads 16, 26 can be easily arranged in a position away from the central line A-A of the gasket. Therefore, if a moment is considered, it is preferable to provide the shape of the beads 13, 23 for water sealing or the beads 14, 24 for oil sealing which has a lower seal surface pressure compared to that of the shape of the beads 12, 22 for the cylinder bores which has generally a high seal surface pressure.

Additionally, the parting beads 16, 26 are provided in such a way that the arrangement of all the beads becomes approximately symmetrical with respect to a line B-B perpendicular to a line C-C connecting the center of the cylinder bores 2. According to the structure, a lateral bending moment of the exhaust side Ex and the intake side In becomes approximately equal relative to the line C-C connecting the center of the cylinder bores 2, so that the deformation around the cylinder bores can be reduced.

According to the structure, since the total ΣL1A, ΣL2A, ΣL3A, or ΣL4A of the length of the beads arranged in each area R1, R2, R3, or R4 divided into four equal areas has approximately the same length, areas of portions wherein the surface pressure is generated become approximately equal. Therefore, force acting on each area R1, R2, R3, R4 becomes approximately equal, and a pressing force acting on an engine member such as the cylinder head and the like becomes approximately equal, so that the deformation of the engine members can be controlled.

The total ΣL1A(=ΣL1), ΣL2A, ΣL3A, or ΣL4A of the length of the beads in each area R1, R2, R3, or R4 can be easily formed in a range of 95% to 100% respectively without performing the pressing test and the like, so that the design of the sealing means can be significantly simplified. Also, since the length or the position of the parting beads 16, 26 may be considered only in a plan view, the parting beads 16, 26 can be easily designed.

Next, a cylinder head gasket design method of the invention will be explained. In this design method, in a plan view, the area is equally divided into the front side Fr and the rear side Rr, and into the exhaust side Ex and the intake side In, so as to be divided into four areas R1, R2, R3, R4. At this time, the parting beads 16, 26 are additionally provided such that the total ΣL2A, ΣL3A, or ΣL4A of the length of the beads in the areas R2, R3, or R4, which is smaller than the largest area R1, becomes more than 95% and below 100% of the total ΣL1A(=ΣL1) of the length of the beads in the largest area R1.

According to the cylinder head gasket design method, by a very simple design method including the parting beads 16, 26 which, although they have the shape of the beads, do not form the seal line, and do not contribute to the direct sealing, the areas of the portions wherein the surface pressure is generated become approximately equal, and force acting on each area R1, R2, R3, R4 can become approximately equal. Therefore, pressing force acting on the engine member such as the cylinder head, the cylinder block or the like becomes approximately equal, so that the cylinder head gasket 1 which can control the deformation of the engine member can be easily designed significantly.

The disclosure of Japanese Patent Application No. 2008-030779, filed on Feb. 12, 2008, is incorporated in the application.

While the invention has been explained with reference to the specific embodiments of the invention, the explanation is illustrative and the invention is limited only by the appended claims.

What is claimed is:

1. A cylinder head gasket comprising:
at least one metal plate having a plurality of cylinder bores arranged linearly, a plurality of liquid holes, and a plurality of bolt holes,
sealing beads formed around the cylinder bores and the fluid holes, and
a parting bead formed separately from the sealing beads,
wherein the at least one metal plate is divided, in a plan view, into four areas including a front side and a rear side, and an intake side and an exhaust side by two straight lines perpendicular to each other to have equal surface areas, respectively, said two straight lines having a vertical line and a horizontal line, wherein the vertical line bisects the at least one metal plate, and the horizontal line is not aligned with a horizontal line through the centers of the cylinder bores; a total length of the sealing beads in each of the four areas is obtained to find a first area having a longest total length of the sealing beads and a last area having a total length of the sealing beads less than 95% of the longest total length of the sealing beads in the first area, and
the parting bead is added to the last area such that a total length of the sealing bead and the parting bead therein is between 95% and 100% of the longest total length of the sealing beads in the first area.

2. A cylinder head gasket according to claim 1, wherein said one of the four areas having the longest total length of the sealing beads has the sealing beads only, and at least two of the four areas have the sealing bead and parting bead to have the total length of the sealing bead and the parting bead between 95% and 100% relative to said one area with the sealing bead only.

3. A cylinder head gasket according to claim 2, wherein said sealing beads includes cylinder bore beads, and fluid hole beads surrounding the fluid holes, and said parting bead has a sectional shape same as that of the fluid hole bead.

4. A cylinder head gasket according to claim 2, wherein said parting bead is located between the cylinder bore and an edge of the at least one metal plate without having the fluid hole and bolt hole therebetween.

5. A cylinder head gasket according to claim 4, wherein said parting beads are arranged symmetrically in two of the four areas relative to a line perpendicular to a line connecting centers of cylinder bores.

6. A cylinder head gasket according to claim 1, wherein said gasket comprises two metal plates laminated each other, said sealing beads and said parting bead being formed on at least one of the two metal plates.

7. A cylinder head gasket according to claim 1, wherein the intake side of the gasket has a surface area greater than that of the exhaust side of the gasket when the gasket is divided by a linear line extending through centers of the cylinder bores, said parting bead being formed at the intake side of the gasket between two of the bolt holes.

8. A method of making a cylinder head gasket comprising:
   providing at least one metal plate having a plurality of cylinder bores arranged linearly and a plurality of fluid holes;
   providing sealing beads around the cylinder bores and the fluid holes;
   dividing at least one metal plate, in a plan view, into four areas including a front side and a rear side, and an intake side and an exhaust side by two straight lines perpendicular to each other to have equal surface areas, respectively, said two straight lines having a vertical line and a horizontal line, wherein the vertical line bisects the at least one metal plate, and the horizontal line is not aligned with a horizontal line through the centers of the cylinder bores;
   calculating a total length of the sealing beads located in each of the four areas,
   finding a first area having a longest total length of the sealing beads, and a last area having a total length of the sealing beads less than 95% of the longest total length of the sealing beads in the first area, and
   adding a parting bead to the last area such that a total length of the sealing bead and the parting bead therein is between 95% and 100% of the longest total length of the sealing beads in the first area.

9. A method of making a cylinder head gasket according to claim 8, wherein a plate surface area is only measured and calculated in each of the four areas without holes therein.

10. A method of making a cylinder head gasket according to claim 9, wherein the parting beads are arranged symmetrically in two of the four areas relative to a line perpendicular to a line connecting centers of cylinder bores.

11. A method of making a cylinder head gasket according to claim 8, wherein one of the two straight lines extends along a longitudinal direction of the metal plate having a plurality of cylinder bores arranged linearly.

12. A method of making a cylinder head gasket according to claim 8, wherein the parting bead is formed adjacent to a cylinder bore at the intake side between two bolt holes.

* * * * *